United States Patent
Shariatmadar et al.

(10) Patent No.: US 10,982,755 B2
(45) Date of Patent: Apr. 20, 2021

(54) METHOD OF DETECTING A CHANGE IN THE DIRECTION OF ROTATION OF A ROTATABLE SHAFT

(71) Applicant: DANA BELGIUM N.V., Bruges (BE)

(72) Inventors: Keivan Shariatmadar, Eeklo (BE); Benoit J G Vandevoorde, Ghent (BE)

(73) Assignee: Dana Belgium N.V., Bruges (BE)

( * ) Notice: Subject to any disclaimer, the term of this patent is extended or adjusted under 35 U.S.C. 154(b) by 225 days.

(21) Appl. No.: 16/305,469

(22) PCT Filed: May 23, 2017

(86) PCT No.: PCT/EP2017/062432
§ 371 (c)(1),
(2) Date: Nov. 29, 2018

(87) PCT Pub. No.: WO2017/207357
PCT Pub. Date: Dec. 7, 2017

(65) Prior Publication Data
US 2020/0325983 A1    Oct. 15, 2020

(30) Foreign Application Priority Data
May 30, 2016   (EP) ..................................... 16172053

(51) Int. Cl.
*F16H 59/44*     (2006.01)
*F16H 59/40*     (2006.01)
(Continued)

(52) U.S. Cl.
CPC ............. *F16H 59/44* (2013.01); *F16H 59/40* (2013.01); *F16H 59/42* (2013.01); *F16H 59/56* (2013.01);
(Continued)

(58) Field of Classification Search
None
See application file for complete search history.

(56) References Cited

U.S. PATENT DOCUMENTS

| 4,259,625 | A | * | 3/1981 | Hatakeyama | ........ | G11B 15/093 |
| | | | | | | 318/258 |
| 4,918,443 | A | * | 4/1990 | Yoshida | ................. | G01D 5/247 |
| | | | | | | 341/6 |

(Continued)

FOREIGN PATENT DOCUMENTS

| DE | 19937052 | | 2/2000 | | |
| DE | 19937052 | A1 * | 2/2000 | ............. | F16D 48/06 |

(Continued)

OTHER PUBLICATIONS

European Patent Office, International Search Report with Written Opinion issued in PCT/EP2017/062432, dated Jul. 24, 2017, 12 pages, European Patent Office, Rijswijk, Netherlands.

*Primary Examiner* — Dirk Wright
(74) *Attorney, Agent, or Firm* — McCoy Russell LLP

(57) ABSTRACT

The invention relates to a method of detecting a change in the direction of rotation of a rotatable shaft (5) based on non-direction sensitive rotational speed data, the method comprising the steps: ●determining a speed (17) of a rotatable shaft (5) of a vehicle transmission (3) based on non-direction sensitive speed data received from a non-direction sensitive rotational speed sensor (7), wherein the speed (17) of the rotatable shaft (5) is the absolute value of the rotational speed of the rotatable shaft (5); ●determining, based on the speed (17) of the rotatable shaft (5), if the duration of a first continuous time interval (20) during which the speed (17) of the rotatable shaft (5) is continually smaller than a first predetermined speed value (18) is shorter than a predetermined duration (24); and ●detecting that a change in the direction of rotation of the rotatable shaft (5) has (Continued)

occurred during the first continuous time interval (20) if the duration of the first continuous time interval (20) is shorter than the predetermined duration (24). The invention further relates to a controller (8) for carrying out the method and to a driveline (100; 200) including the controller (8). The invention allows to determine a change in direction although the sensor as such is not direction sensitive. This is based on the insight that decelerating to a speed value below a threshold and subsequently accelerating again to a value which is above this threshold corresponds to a change in direction if this process occurs within a short time period.

13 Claims, 7 Drawing Sheets

(51) Int. Cl.
*F16H 59/42* (2006.01)
*F16H 59/56* (2006.01)
*G01P 13/04* (2006.01)

(52) U.S. Cl.
CPC ........ *G01P 13/04* (2013.01); *F16H 2059/443* (2013.01)

(56) References Cited

U.S. PATENT DOCUMENTS

| | | | | |
|---|---|---|---|---|
| 6,662,095 | B1* | 12/2003 | Habeck | F16H 59/40 |
| | | | | 477/47 |
| 6,969,986 | B2* | 11/2005 | Schmid | G01P 3/489 |
| | | | | 324/166 |
| 7,285,074 | B2* | 10/2007 | Gartner | G01P 3/488 |
| | | | | 324/165 |
| 8,177,679 | B2* | 5/2012 | Matsubara | B60W 10/08 |
| | | | | 477/3 |
| 2018/0031594 | A1* | 2/2018 | Joseph | F02D 41/28 |

FOREIGN PATENT DOCUMENTS

| | | | | |
|---|---|---|---|---|
| EP | | 2390489 | 11/2011 | |
| EP | | 2390489 A1 * | 11/2011 | ........... F04D 41/009 |

* cited by examiner

METHOD OF DETECTING A CHANGE IN THE DIRECTION OF ROTATION OF A ROTATABLE SHAFT

BACKGROUND

The invention relates to a method of detecting a change in the direction of rotation of a rotatable shaft, to a controller for carrying out the method, and to a driveline comprising the controller.

The main purpose of a vehicle transmission is to alter the ratio and/or direction of rotation between its input shaft and its output shaft(s). This can be accomplished in many ways, but transmissions invariably contain multiple components which rotate at different speeds and directions. In order to effectively control the functioning of the transmission, a minimum number of these rotational speeds need to be known (e.g., through one or more measurements). The speeds of the remaining components can then usually be determined based on the known speeds and based on the known design of the transmission. For example, if the gear ratio or speed ratio between a first shaft and a second shaft is known, the speed of the second shaft may be determined based on the known speed of the first shaft and based on the known gear ratio or speed ratio between the first and the second shaft by multiplying the known speed of the first shaft by the known gear ratio or speed ratio between the two shafts.

Rotational speed sensors exist in two variants: bidirectional and unidirectional. Bidirectional speed sensors are configured to detect both the rotational speed of a component and its direction of rotation. By contrast, unidirectional speed sensors may detect the rotational speed of a rotatable component such as a shaft, but they are not configured to detect the direction or rotation of that component. In some gearboxes, unidirectional speed sensors are used although the components whose speed they are intended to measure may rotate in both directions, depending on the selected gear. In this case, the transmission controller cannot discern whether the component is turning clockwise or counter-clockwise.

This lack of information may be overcome by using bidirectional speed sensors. However, bidirectional speed sensors are more costly than unidirectional speed sensors. Therefore, known transmissions often include unidirectional speed sensors and the corresponding transmission controller is programmed to shift the transmission through a neutral state rather than to carry out a direct shift. In this manner, the initial conditions for a subsequent shift are known. However, this procedure typically causes longer shifting times and increased wear, which is undesirable. Other known controllers are programmed to slow down the engagement during a shift in order to prevent damage that may be inflicted in case one of the rotatable components to be engaged is still rotating at the time of engagement. Thus, the shifting procedure could be carried out faster if the direction of rotation of the components to be engaged were known.

Therefore, there is demand for a transmission controller which is configured to detect a change in the direction of rotation of a rotatable component of the transmission based on non-direction sensitive rotational speed data measured by a non-direction sensitive rotational speed sensor.

This objective is solved by a method according to claim 1, by a controller configured to carry out the method, and by a driveline comprising said controller. Special embodiments are described in the dependent claims.

SUMMARY

The presently proposed method of detecting a change in the direction of rotation of a rotatable shaft based on non-direction sensitive rotational speed data comprises the following steps:

determining a speed of a rotatable shaft of a vehicle transmission based on non-direction sensitive speed data received from a non-direction sensitive rotational speed sensor, wherein the speed of the rotatable shaft is the absolute value of the rotational speed of the rotatable shaft;

determining, based on the speed of the rotatable shaft, if the duration, in particular the maximum duration, of a first continuous time interval during which the speed of the rotatable shaft is continually smaller than a first predetermined speed value is shorter than a predetermined duration; and detecting that a change in the direction of rotation of the rotatable shaft has occurred during the first continuous time interval if the duration of the first continuous time interval is shorter than the predetermined duration.

The presently proposed method is based on the insight that decelerating the speed of the rotational shaft to a speed value which is smaller than the first predetermined speed value and subsequently accelerating the speed of the rotational shaft speed to a speed value which is larger than the first predetermined speed value corresponds with a change in the direction of rotation of the rotatable shaft if this process occurs within a short time period. In the proposed method this is reflected by the fact that a change in the direction of rotation of the rotatable shaft is detected if it is found that the duration of the first continuous time interval is shorter than the predetermined duration. Typically, the predetermined duration may have a duration of at most 2 s, preferably of at most 1 s, more preferably of at most 0.5 s.

For example, a driver changing the direction of motion of the vehicle by shifting the transmission from a forward gear to a reverse gear or vice versa (corresponding with a change in the direction of rotation of the rotatable transmission shaft) typically does within a period of time which is shorter than the predetermined duration. Another scenario may include the vehicle changing its direction of motion (corresponding with a change in the direction of rotation of the rotatable transmission shaft) without changing gear. For example, the vehicle may roll up a slope, slow down and roll back down the slope due to the gravitational force acting on the vehicle. Also in this second scenario, the change in the direction of motion of the vehicle (and of the rotatable transmission shaft) occurs abruptly, for example within a few seconds at most. On the other hand, a driver driving the vehicle in a given direction and bringing the vehicle to a halt or to a near halt without changing the direction of rotation of the vehicle (for example to avoid hitting an obstacle) will in most cases stop the vehicle or keep the vehicle at a low speed at least for the predetermined duration, for example at least for 0.5 s or at least for 1 s.

By determining the speed of the rotatable transmission shaft based on non-direction sensitive speed data received from a non-direction sensitive rotational speed sensor, the method may be carried out in a particularly cost-saving manner.

The rotatable transmission shaft may be drivingly engaged or selectively drivingly engaged with a ground engaging structure of the vehicle, for example with one or more wheels or with a crawler chain of the vehicle. In particular, the rotatable shaft may be an output shaft of the transmission. The rotatable shaft may also be an input shaft of the transmission. For example, the rotatable shaft may be drivingly engaged or selectively drivingly engaged with a fluid coupling device such as a torque converter providing a fluid coupling between the transmission and a power source. Typically, a fluid coupling device includes an impeller portion drivingly engaged or selectively drivingly engaged with the power source, and a turbine portion drivingly engaged or selectively drivingly engaged with an input of the transmission. The power source may comprise an internal combustion engine or an electric engine, for example. The rotatable shaft may likewise be an intermediate transmission shaft such as a drum shaft providing a mechanical coupling between different stages of the transmission.

The first predetermined speed value is typically configured as a constant, usually a tunable constant. For example, the first predetermined speed value may be at most $3\ s^{-1}$, at most $2\ s^{-1}$, or at most $1\ s^{-1}$. However, it is conceivable that the first predetermined speed value is chosen based on at least one transmission signal, wherein the transmission signal is indicative of a speed ratio or drive ratio between the rotatable shaft and the ground engaging structure. For example, the first predetermined speed value may be set such that it corresponds with a predetermined vehicle speed, wherein the predetermined vehicle speed may be at most 5 km/h, at most 3 km/h, or at most 1 km/h.

The invention may further relate to a method of determining the absolute direction of rotation of the rotatable shaft, for example with respect to a vehicle rest frame. This method may be claimed independently of the above-described method of determining a change in the direction of rotation of the rotatable transmission shaft. Alternatively, the steps of the method of determining the absolute direction of rotation of the rotatable shaft may be part of the method of determining a change in the direction of rotation of the rotatable transmission shaft.

The absolute direction of rotation of the rotatable transmission shaft may be determined based on power source data indicative of the direction of rotation of a power source drivingly engaged with or coupled to the rotatable shaft, and based on at least one transmission signal, wherein the transmission signal is indicative of the direction of rotation of the rotatable shaft relative to the direction of rotation of an input shaft of the transmission and/or relative to the direction of rotation of the power source. Usually, the transmission signal is indicative of a transmission state the transmission is in.

Once the absolute direction of rotation of the rotatable transmission shaft has been determined in this way at a first point in time, the absolute direction of rotation of the same rotatable transmission shaft at a second later point in time may be determined based on the absolute direction of rotation of the shaft determined at the first point in time and based on the number of changes in the direction of rotation of the shaft detected between the first point in time and the second point in time, as is readily apparent to a person of ordinary skill. In particular, the changes in the direction of rotation occurring between the first point in time and the second point in time may be detected according to the above-described method of detecting a change in the direction of rotation of the rotatable transmission shaft based on non-direction sensitive speed data.

Information on the absolute direction of rotation of the rotatable shaft may be used for controlling a gear shift of the transmission. For example, the information on the absolute direction of rotation of the rotatable transmission shaft may be used for determining a point in time at which the rotatable transmission shaft is engaged with a further shaft of the transmission during a gear shift. Additionally or alternatively, the information on the absolute direction of rotation of the rotatable transmission shaft may be used for determining or setting a duration of an engagement time period, wherein the engagement time period is the time needed for bringing the rotatable shaft and the further shaft from a mutually disengaged state to an engaged state, or vice versa.

The at least one transmission signal indicative of the direction of rotation of the rotatable shaft relative to the direction of rotation of the power source may comprise at least one clutch signal, wherein the clutch signal is indicative of a state of at least one clutching device of the transmission. For example, the clutch signal may indicate whether one or more clutches of the transmission are engaged or disengaged, and/or whether one or more clutches of the transmission are in a slipping state. In particular, the clutch signal may comprise at least one hydraulic pressure signal indicative of a hydraulic pressure in at least one clutch chamber of at least one hydraulic clutching device of the transmission. Additionally or alternatively, the clutch signal may comprise at last one electric signal for controlling at least one clutching device of the transmission, preferably for controlling at least one hydraulic valve of at least one hydraulic clutching device.

The state of the at least one clutching device may be determined based on whether the hydraulic pressure in the clutch chamber(s) is above or below at least one predetermined pressure value. For example, a hydraulic pressure in a clutch chamber of a hydraulic clutching device below a first predetermined pressure value may be indicative of this clutching device being in a disengaged state. Similarly, a hydraulic pressure in the clutch chamber of the hydraulic clutching device above a second predetermined pressure value may be indicative of this clutching device being in an engaged state. It is understood that, typically, the second predetermined pressure value is higher than the first predetermined pressure value.

The rotatable transmission shaft may be coupled to the power source by means of a fluid coupling device such as a torque converter. The rotatable transmission shaft may likewise be coupled to the power source by means of a rigid connection which may comprise one or more shafts and/or one or more clutches.

If the transmission and the power source are coupled through a fluid coupling device such as a torque converter, the turbine portion of the fluid coupling device may at least temporarily turn in both directions relative to the direction of rotation of the power source. However, fluid coupling devices such as torque converters are typically designed in such a way that, at least after the end of a stabilization phase, the turbine portion of the fluid coupling device turns in a predetermined direction relative to the impeller portion of the fluid coupling device. The stabilization phase may have a duration of at least 100 ms, of at least 300 ms, or of at least 500 ms, for example.

Therefore, right after a shift the transmission signal or the state of the transmission may be indicative of the direction of rotation of the rotatable transmission shaft relative to the direction of rotation of the power source only after the end of the stabilization phase, wherein the stabilization phase usually starts once the shifting procedure has terminated and the transmission is in the new transmission state. Thus, the step of determining the absolute direction of rotation of the rotatable shaft is preferably carried out only if or once a duration of a second continuous time interval during which the transmission is continually in the same transmission state exceeds the duration of the stabilization phase.

Furthermore, the turbine portion of the fluid coupling device typically turns in a defined predetermined direction relative to the direction of rotation of the impeller portion of the fluid coupling device only if the rotational speed of the turbine portion exceeds a threshold value. In other words, if the power source and the transmission are coupled by means of a fluid coupling device, the transmission signal or the state of the transmission may be indicative of the direction of rotation of the rotatable transmission shaft relative to the direction of rotation of the power source only if the rotational speed of the turbine portion or if the rotational speed of the rotatable transmission shaft exceeds a second predetermined speed value. It may therefore be preferable to carry out the step of determining the direction of rotation of the rotatable shaft only if or once the speed of the rotatable transmission shaft, the speed of the turbine portion of the fluid coupling device, or a speed of the vehicle exceeds a second predetermined speed value.

The step of determining the absolute direction of rotation of the rotatable transmission shaft may be carried out each time a change in the direction of rotation of the rotatable transmission shaft is detected and/or each time the power source is turned back on after a power source switch-off and/or each time the first continuous time interval has ended and the duration of the first continuous time interval exceeds the predetermined duration. In this way, the information on the absolute direction of rotation of the rotatable transmission shaft is available at all times or during most of the time the transmission is operational.

The presently proposed subject-matter further relates to a controller for controlling a vehicle transmission, wherein the controller is configured to carry out the above-described method(s) or method steps. The controller typically includes a processing unit such as a microprocessor or an FPGA and a memory in communication with the processing unit. The controller may be in communication with one or more clutching devices of the transmission for controlling the state of the clutching devices, in particular for performing a gear shift. For example, the controller may be configured to actuate one or more clutching devices of the transmission to change their transmission state from an engaged state to a disengaged state or vice versa.

Additionally or alternatively, the controller may be in communication with one or more direction sensitive or non-direction sensitive speed sensors of the transmission, with one or more pressure sensors or with one or more temperature sensors of the transmission. The pressure sensors may be configures to measure a hydraulic pressure in one or more clutch chambers of one or more hydraulic clutching devices of the transmission, for example. In particular the controller may be in communication with the non-direction sensitive rotational speed sensor configured to measure or detect the rotational speed of the rotatable transmission shaft.

The presently proposed subject-matter further relates to a driveline for a vehicle, wherein the driveline comprises:
 a power source;
 a transmission comprising a rotatable transmission shaft, wherein the rotatable transmission shaft is selectively drivingly engaged with or selectively coupled to the power source, preferably through a fluid coupling device such as a torque converter;
 a ground engaging structure drivingly engaged with or selectively drivingly engaged with the rotatable transmission shaft;
 a non-direction sensitive rotational speed sensor for measuring an absolute value of a rotational speed of the rotatable transmission shaft; and
 the above-described controller.

The power source and the transmission of the driveline may be configured as described above. The transmission may include a first transmission stage comprising at least one clutching device, and a second transmission stage comprising at least one clutching device. The first transmission stage and the second transmission stage may be drivingly engaged with each other through a drum shaft. The clutching devices of the first and/or of the second transmission stage may be configured as hydraulic clutches, for example.

BRIEF DESCRIPTION OF THE DRAWINGS

The above, as well as other advantages of the presently proposed subject-matter will become readily apparent to those skilled in the art from the following detailed description when considered in the light of the accompanying drawings in which.

DETAILED DESCRIPTION

Figure 1:
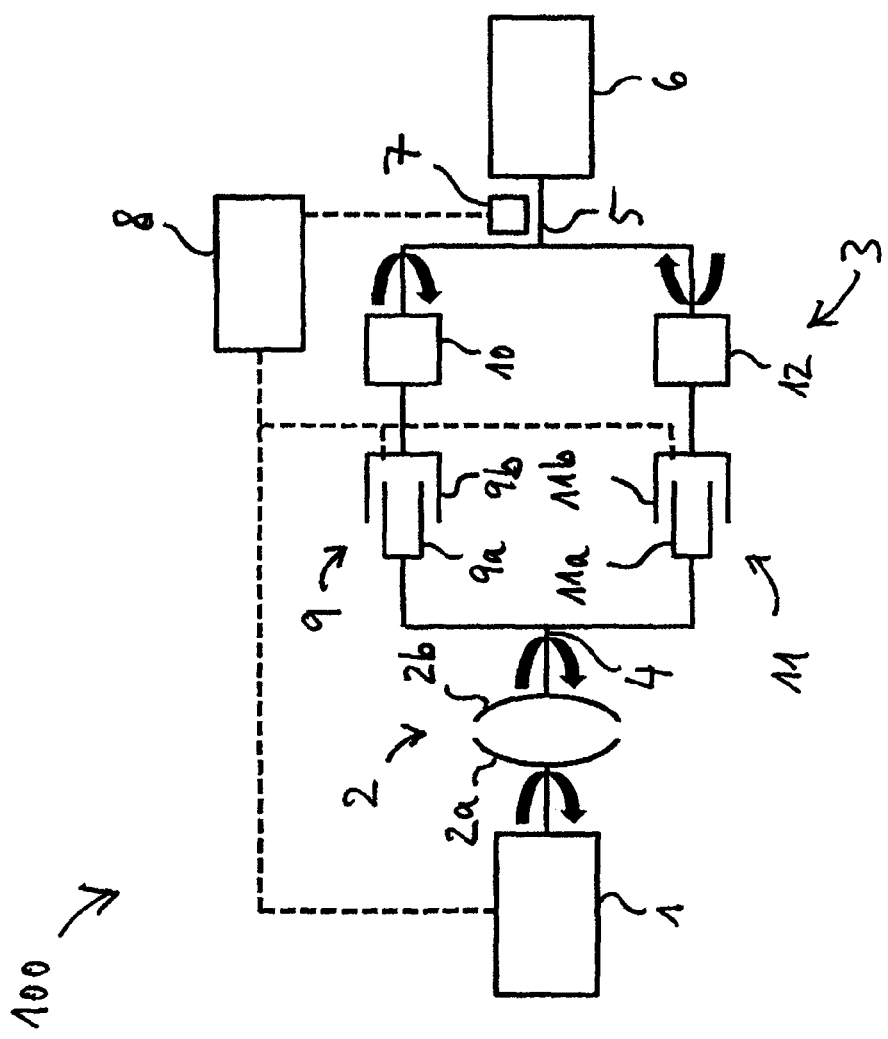
FIG. 1 shows a first driveline according to the invention.

FIG. 1 shows a driveline 100 according to the present invention. The driveline 100 is arranged in a vehicle (not shown), in particular in an off-highway vehicle such as a mining vehicle, a material handling vehicle, an earthmoving vehicle or a tractor, for example. The driveline 100 includes a power source 1, a coupling device 2, a transmission 3 including an input shaft 4 and an output shaft 5, a non-direction sensitive speed sensor 7, a vehicle output 6, and a controller 8. The non-direction sensitive speed sensor 7 is configured to measure an output speed of the output shaft 5, wherein the output speed is the absolute value of a rotational speed of the output shaft 5. The transmission 3 is configured to selectively drivingly engage the output shaft 5 of the transmission 3 with the input shaft 4 of the transmission 3. The input shaft 4 is drivingly engaged or selectively drivingly engaged with the power source 1 through the coupling device 2. The vehicle output 6 is drivingly engaged or selectively drivingly engaged with the output shaft 5. The controller 8 is in communication with the power source 1, the transmission 3 and the non-direction sensitive speed sensor 7, as indicated by the dashed lines in FIG. 1.

The power source 1 may include an engine such as an internal combustion engine (ICE) or an electric engine. The vehicle output 6 may include a ground engaging structure such as one or more wheels or one or more crawler chains, for example. The speed sensor 7 is configured to measure the absolute value of the rotational speed of the output shaft 5. Non-direction sensitive speed sensors such as the speed sensor 7 shown in FIG. 1 are generally known in the art of automotive transmissions. For example, the speed sensor 7 may include at least one of a capacitive sensor, a magnetic sensor and an optical sensor. Non-direction sensitive speed sensors such as the speed sensor 7 shown in FIG. 1 are less costly than direction sensitive speed sensors which are configured to measure both an absolute value of a rotational speed of a rotating component and the direction of rotation of the rotating component. In an alternative embodiment not depicted here the speed sensor 7 could be arranged to measure the absolute value of the rotational speed of the input shaft 4. Also, the driveline 100 could comprise two or more non-directional speed sensors such as the speed sensor 7, for example for measuring the speed of both the input shaft 4 and the output shaft 5. Additionally, the driveline 100 could comprise one or more direction sensitive speed sensors. However, non-direction sensitive speed sensors are generally preferred.

The coupling device 2 of the driveline 100 shown in FIG. 1 comprises a fluid coupling device, in particular a torque converter having an impeller portion 2a in driving engagement with the power source 1, a turbine portion 2b in driving engagement with the input shaft 4 and a stator portion (not shown). Torque converters are generally known in the art of automotive transmissions. Torque may be transmitted between the impeller portion 2a and the turbine portion 2b by means of a hydrodynamic fluid coupling between the impeller portion 2a and the turbine portion 2b. The fluid coupling between the impeller portion 2a and the turbine portion 2b may at least temporarily allow the turbine portion 2b to turn either in the same direction as the impeller portion 2a or in a direction opposite to the direction of rotation of the impeller portion 2a. However, the coupling device 2 is typically designed in such a way that, at least after the end of a stabilization phase, the turbine portion 2b always turns in a predetermined direction of rotation relative to the direction of rotation of the impeller portion 2a. For example, the coupling device 2 may be designed in such a way that, at least after the end of the stabilization phase, the turbine portion 2b always turns in the same direction of rotation as the impeller portion 2a. The duration of the stabilization phase may depend on factors such as the design of the coupling device 2, a gear ratio between the output shaft 5 and the input shaft 4, and a load coupled to the vehicle output 6. Alternatively, the coupling device 2 may include any device configured to drivingly engage the input shaft 4 with the power source 1. For example, the coupling device 2 could include a gearbox including shafts, gears and clutches. The transmission 3 further includes a first clutching device 9, a first speed ratio 10, a second clutching device 11, and a second speed ratio 12. The first clutching device 9 may be configured as a hydraulic clutching device including a first clutch chamber and a first hydraulically controlled actuator at least partially disposed in the first clutch chamber. The first hydraulic actuator may include a piston. The first hydraulic actuator may be actuated by varying the pressure of a hydraulic fluid in the first clutch chamber. For example, a plurality of friction plates of an input portion 9a of the first clutching device 9 may be selectively pressed against and engaged with a plurality of friction plates of an output portion 9b of the first clutching device 9 using the first hydraulic actuator by increasing the hydraulic pressure in the first clutch chamber. When the input portion 9a and the output portion 9b of the first clutching device 9 are engaged, the input portion 9a and the output portion 9b are locked to one another and torque may be transferred through the first clutching device 9. On the other hand, the input portion 9a and the output portion 9b of the first clutching device 9 may be selectively disengaged by decreasing the hydraulic pressure in the first clutch chamber. When the input portion 9a and the output portion 9b of the first clutching device 9 are disengaged, no torque may be transferred through the first clutching device 9.

The second clutching device 11 may be configured as a hydraulic clutching device including a second clutch chamber and a second hydraulically controlled actuator at least partially disposed in the second clutch chamber. The second hydraulic actuator may be actuated by varying the pressure of a hydraulic fluid in the second clutch chamber. The second hydraulic actuator may include a piston. For example, a plurality of friction plates of an input portion 11a of the second clutching device 11 may be selectively pressed against and engaged with a plurality of friction plates of an output portion 11b of the second clutching device 11 using the second hydraulic actuator by increasing the hydraulic pressure in the second clutch chamber. When the input portion 11a and the output portion 11b of the second clutching device 11 are engaged, the input portion 11a and the output portion 11b are locked to one another and torque may be transferred through the second clutching device 11. On the other hand, the input portion 11a and the output portion 11b of the second clutching device 11 may be selectively disengaged by decreasing the hydraulic pressure in the second clutch chamber. When the input portion 11a and the output portion 11b of the second clutching device 11 are disengaged, no torque may be transferred through the second clutching device 11.

When the first clutching device 9 is engaged and the second clutching device 11 is disengaged, the transmission 3 is in a first transmission state. In the first transmission state, the speed ratio of the output shaft 5 relative to the input shaft 4 is determined by the first speed ratio 10. That is, in the first transmission state the first speed ratio 10 determines a rotational speed of the output shaft 5 relative to a rotational speed of the input shaft 4 and a direction of rotation of the output shaft 5 relative to the direction of rotation of the input shaft 4.

On the other hand, when the first clutching device 9 is disengaged and the second clutching device 11 is engaged, the transmission 3 is in a second transmission state. In the second transmission state, the speed ratio of the output shaft 5 relative to the input shaft 4 is determined by the second speed ratio 12. That is, in the second transmission state the second speed ratio 12 determines the rotational speed of the output shaft 5 relative to the rotational speed of the input shaft 4 and the direction of rotation of the output shaft 5 relative to the direction of rotation of the input shaft 4.

The transmission 3 further has a neutral state in which both the first clutching device 9 and the second clutching device 11 are disengaged. When the transmission 3 is in the neutral state, no torque may be transmitted from the input shaft 4 to the output shaft 5, or vice versa.

The speed ratios 10, 12 are configured such that they are associated with mutually opposite directions of rotation of the output shaft 5 relative to the direction of rotation of the input shaft 4, as indicated by the black arrows in FIG. 1. Specifically, when the transmission 3 is in the first transmission state and the input shaft 4 turns clockwise/counterclockwise, the output shaft 5 turns clockwise/counterclockwise, respectively; and when the transmission 3 is in the second transmission state and the input shaft 4 turns clockwise/counterclockwise, the output shaft 5 turns counterclockwise/clockwise, respectively. For example, the first transmission state may be a forward gear, and the second transmission state may be a reverse gear, or vice versa.

The controller 8 is configured to receive speed data from the non-direction sensitive speed sensor 7 and to determine the output speed of the output shaft 5 based on the speed data received from the speed sensor 7. The controller 8 is further configured to receive rotational direction data indicative of the direction of rotation of the power source 1. The rotational direction data may be stored in a memory of the controller 8, in particular if the power source 1 is configured as a unidirectional engine which always turns in the same direction, such as an internal combustion engine. Alternatively, the power source 1 may be configured to transmit the rotational direction data to the controller 8, in particular if the power source 1 is configured as an engine which may turn both clockwise and counterclockwise, such as an electric engine.

The controller 8 is further configured to receive a transmission signal from the transmission 3. The transmission signal may include a first clutch signal which is indicative of the state of the first clutching device 9 and a second clutch signal which is indicative of the state of the second clutching device 11. For example, the controller 8 is configured to determine, based on the first clutch signal, whether the first clutching device 9 is engaged, whether the first clutching device 9 is disengaged, or whether the first clutching device 9 is slipping. Similarly, the controller 8 is configured to determine, based on the second clutch signal, whether the second clutching device 11 is engaged, whether the second clutching device 11 is disengaged, or whether the second clutching device 11 is slipping.

Thus, the controller 8 is configured to determine, based on the first clutch signal and based on the second clutch signal, whether the transmission 3 is in the first state in which the first clutching device 9 is engaged and the second clutching device 11 is disengaged, whether the transmission 3 is in the second state in which the first clutching device 9 is disengaged and the second clutching device 11 is engaged, or whether the transmission 3 is in the neutral state in which both clutching devices 9, 11 are disengaged.

In other words, based on the first clutch signal and on the second clutch signal the controller 8 may determine at least the direction of rotation of the output shaft 5 relative to the direction of rotation of the input shaft 4. Also, the controller 8 may determine the absolute value of the speed ratio of the output shaft 5 relative to the input shaft 4 based on the first clutch signal and on the second clutch signal. For example, the direction of rotation of the output shaft 5 relative to the direction of rotation of the input shaft 4 associated with the first transmission state and with the second transmission state may be stored in the memory of the controller 8. Additionally, the absolute value of the speed ratio of the output shaft 5 relative to the input shaft 4 associated with the first transmission state and with the second transmission state may be stored in the memory of the controller 8.

In the driveline 100 where the clutching devices 9, 11 are configured as hydraulic clutches, the first clutch signal may comprise a first hydraulic pressure signal indicative of a first hydraulic pressure in the first clutch chamber of the first clutching device 9, and the second clutch signal may comprise a second hydraulic pressure signal indicative of a second hydraulic pressure in the second clutch chamber of the second clutching device 11. For example, the first clutching device 9 and the second clutching device 11 may each be equipped with pressure sensors for measuring the hydraulic pressure in the first clutch chamber and in the second clutch chamber. These pressure sensors may be in communication with the controller 8 for communicating the measured pressure values to the controller 8.

Alternatively, the first clutch signal may comprise a first electric signal for controlling the first clutching device 9, in particular for controlling at least one first hydraulic valve, wherein the at least one first hydraulic valve may be configured to control a flow of fluid into and out the clutch chamber of the first clutching device 9. Analogously, the second clutch signal may alternatively comprise a second electric signal for controlling the second clutching device 11, in particular for controlling at least one second hydraulic valve, wherein the at least one second hydraulic valve may be configured to control a flow of fluid into and out the clutch chamber of the second clutching device 11.

Figure 2:
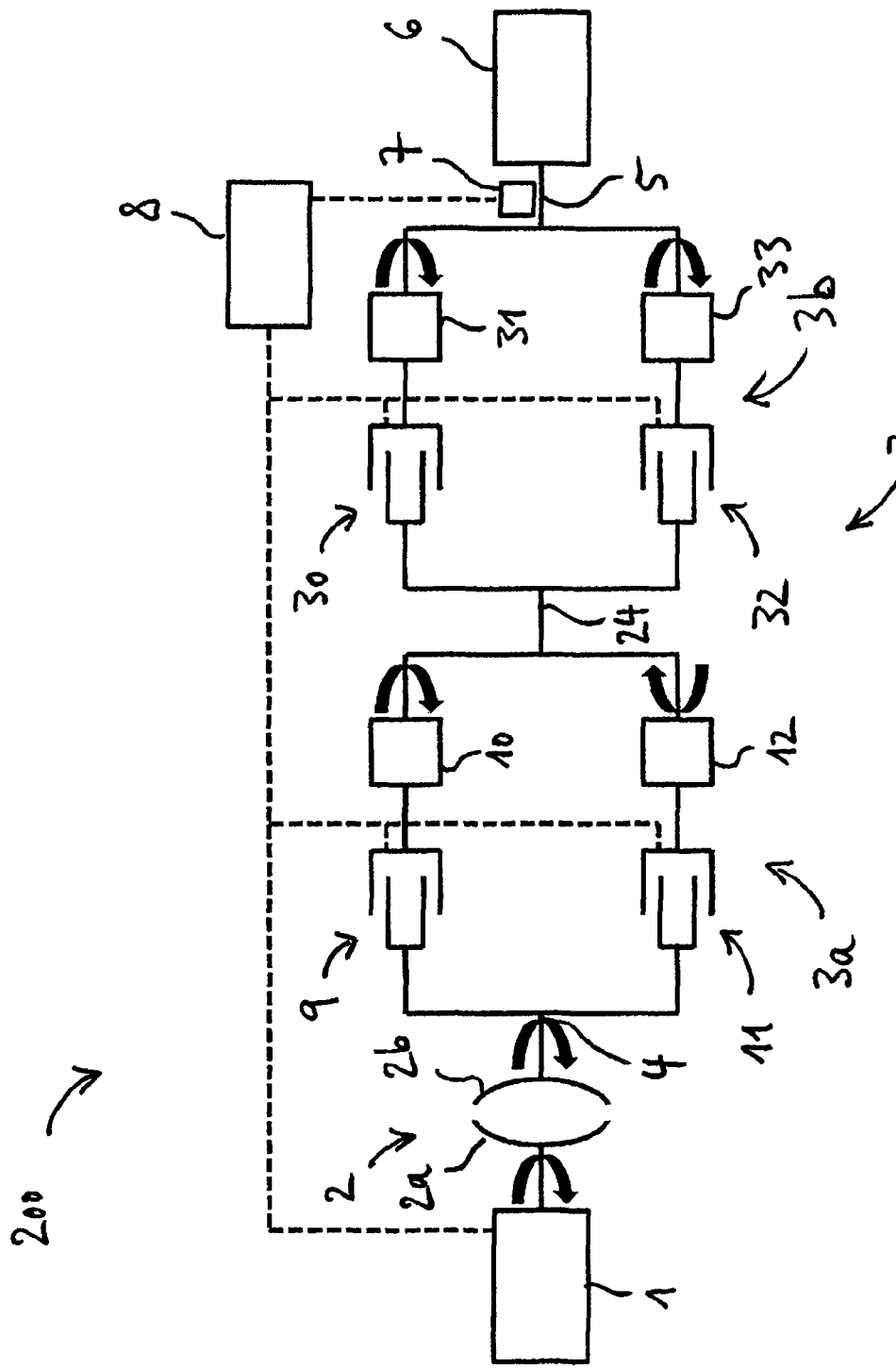
FIG. 2 shows a second driveline according to the invention comprising a first transmission stage and a second transmission stage.

FIG. 2 shows another driveline 200 according to the present invention. Here and in the following, recurring features are designated by the same reference signs. The driveline 200 of FIG. 2 differs from the driveline 100 of FIG. 1 in that the transmission 3 of the driveline 200 comprises a first transmission stage 3a and a second transmission stage 3b, wherein an output of the first transmission stage 3a is drivingly engaged with an input of the second transmission stage 3b through a drum shaft 24.

The clutching devices 9, 11 and the speed ratios 10, 12 of the first transmission stage 3a of the driveline 200 of FIG. 2 are identical to the clutching devices 9, 11 and the speed ratios 10, 12 of the transmission 3 of the driveline 100 of FIG. 1. The second transmission stage 3b comprises a third clutching device 30, a third speed ratio 31, a fourth clutching device 32, and a fourth speed ratio 33. The clutching devices 30, 32 may be configured as hydraulic clutches like the clutching devices 9, 10. However, it is understood that the clutching devices 30, 32 could be configured as a different type of clutching device known in the art of automotive transmissions.

As opposed to the speed ratios 10, 12 of the first transmission stage 3a, the speed ratios 31, 33 of the second transmission stage 3b are configured such that they are both associated with the same direction of rotation of the output shaft 5 relative to the direction of rotation of the drum shaft 24, as indicated by the black arrows in FIG. 2. For example, when the drum shaft 24 turns clockwise/counterclockwise, the third clutching device 30 is engaged and the fourth clutching device 32 is disengaged, the output shaft 5 may turn clock-wise/counterclockwise, respectively. Similarly, when the drum shaft 24 turns clockwise/counterclockwise, the third clutching device 30 is disengaged and the fourth clutching device 32 is engaged, the output shaft 5 may turn clock-wise/counterclockwise, respectively. However, the speed ratios 31, 33 are associated with different absolute values of the speed ratio of the output shaft 5 relative to the drum shaft 24. Specifically, the speed ratio 31 is configured as a low range speed ratio and the speed ratio 33 is configured as a high range speed ratio.

Thus, to a person of ordinary skill in the field of automotive transmissions it is immediately apparent that in the driveline 200 of FIG. 2 the direction of rotation of the output shaft 5 relative to the direction of rotation of the input shaft 4 depends on which one of the clutching devices 9, 11 of the first transmission stage 3a is engaged. Hence, the clutching devices 9, 11 of the first transmission stage 3a may be referred to as the direction clutches of the driveline 200.

To a person of ordinary skill it is furthermore immediately apparent that each of the clutching devices 9, 11 may be combined with either one of the clutching devices 30, 32 of the second transmission stage 3b. Therefore, the transmission 3 of the driveline 200 has two first states in which the output shaft 5 and the input shaft 4 turn in the same direction, and two second states in which the output shaft 5 and the input shaft 4 turn in opposite directions. For example, the transmission 3 of the driveline 200 has a low range first state in which the clutching devices 9, 30 are engaged and the clutching devices 11, 32 are disengaged; a high range first state in which the clutching devices 9, 33 are engaged and the clutching devices 11, 30 are disengaged; a low range second state in which the clutching devices 11, 30 are engaged and the clutching devices 9, 32 are disengaged; and a high range second state in which the clutching devices 11, 32 are engaged and the clutching devices 9, 30 are disengaged. The controller 8 of the driveline 200 of FIG. 2 may be configured to determine the state of the clutching devices 9, 11, 30, 32 and the transmission state of the transmission 3 as described above with reference to the driveline 100 of FIG. 1.

It is understood that the present invention may include more complex drivelines than the drivelines 100 of FIG. 1 and the driveline 200 of FIG. 2. For example, the transmission 3 of the driveline 100 could include more than two clutching devices. Similarly, the transmission 3 of the driveline 200 could include more than two clutching devices in at least one or in both of the transmission stages 3a, 3b, and/or the transmission 3 of the driveline 200 could include more than two transmission stages.

Again, although the non-direction sensitive speed sensor 7 depicted if FIG. 2 is configured to measure the speed of the output shaft 5, the speed sensor 7 could likewise be arranged to measure the speed of the input shaft 4 or of the drum shaft 24. Also, the driveline 200 could comprise more than one non-direction sensitive speed sensor. For example, the driveline 200 could comprise non-direction sensitive speed sensors for measuring the speed of the input 4, of the drum shaft 24 and of the output shaft 5. Additionally, the driveline 200 could comprise one or more direction sensitive speed sensors. However, non-direction sensitive speed sensors are generally preferred since they are less costly than direction sensitive speed sensors.

Figure 3:
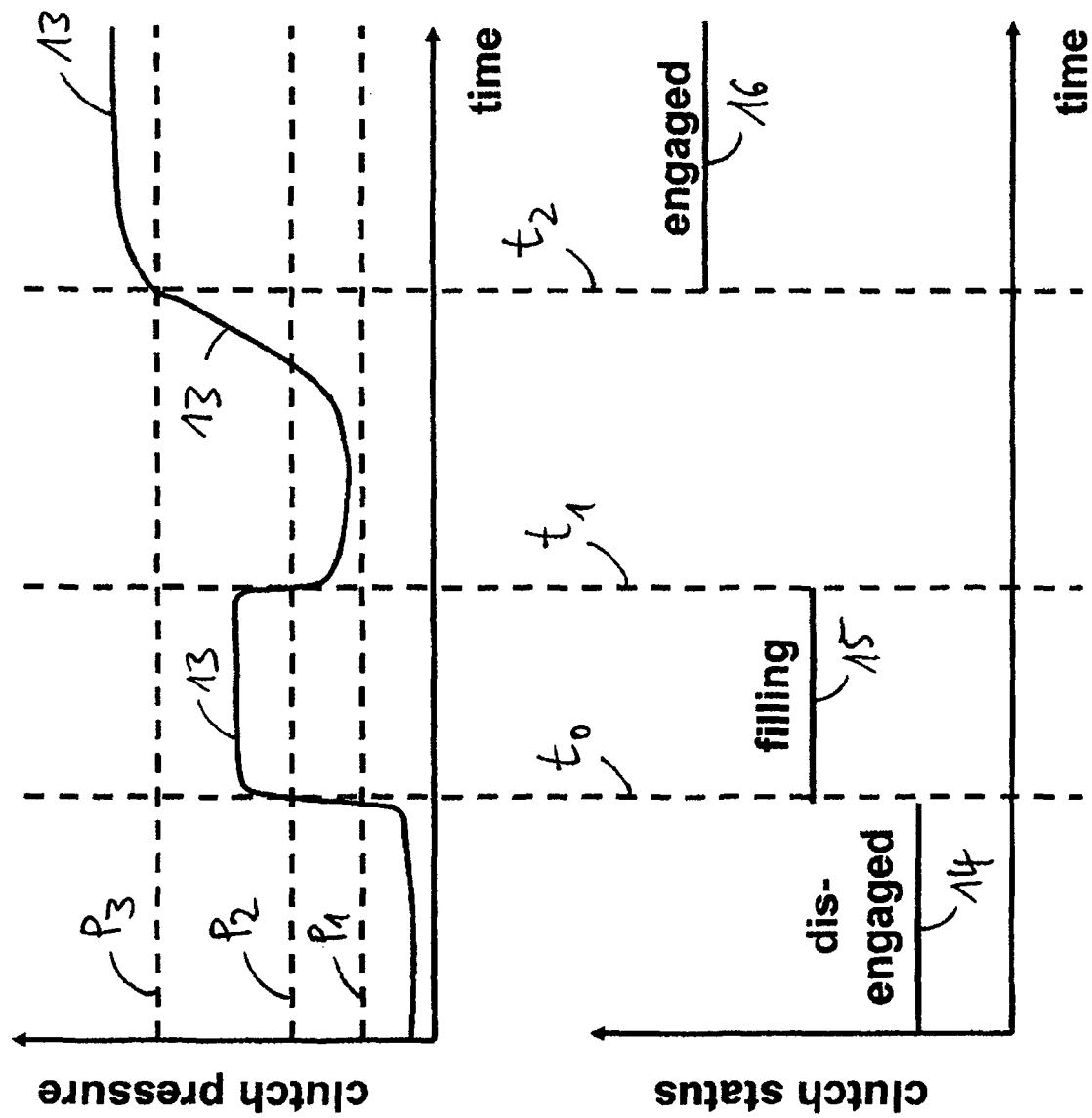
FIG. 3 shows a time trace of a clutch pressure of an on-going clutch.
Figure 4:
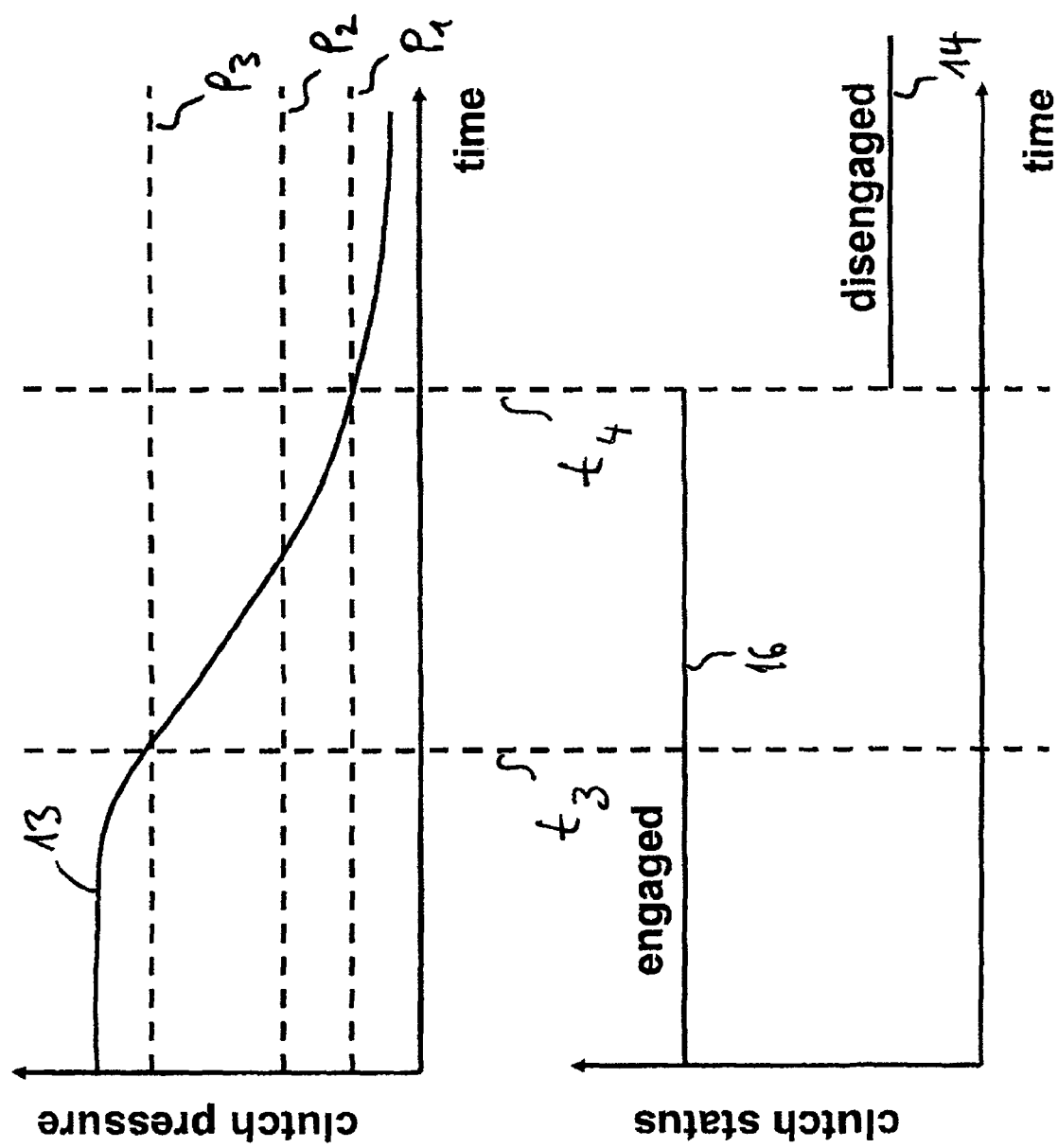
FIG. 4 shows a time trace of a clutch pressure of an off-going clutch.

By way of example, FIGS. 3 and 4 each depict a process of determining the state of the first clutching device 9 based on a first clutch signal, wherein the first clutch signal includes a first hydraulic pressure signal 13 indicative of a first hydraulic pressure in the first clutch chamber of the first clutching device 9. The process is carried out by the controller 8. The upper graphs in FIGS. 3 and 4 show a time trace of the first hydraulic pressure signal 13. The lower graphs in FIGS. 3 and 4 show the state of the first clutching device 9 as determined by the controller 8 based on the first hydraulic pressure signal 13. A process of determining the state of the second clutching device 11, of the third clutching device 30 and of the fourth clutching device 32 based on a hydraulic pressure in these clutching devices 11, 30, 32 may be carried out in the same manner and may include the same steps as explained here below with regard to the first clutching device 9. In the driveline 100, the controller 8 may be configured to simultaneously determine the state of both clutching devices 9, 11. Similarly, in the driveline 200, the controller 8 may be configured to simultaneously determine the state of all clutching devices 9, 11, 30, 32.

The controller 8 is configured to determine the state of the first clutching device 9 by comparing the value of the first hydraulic pressure signal 13 with predetermined pressure values $p_1$, $p_2$ and $p_3$, indicated by dashed horizontal lines in FIGS. 3 and 4, where $p_1 < p_2 < p_3$. The values of $p_1$, $p_2$ and $p_3$ typically depend on the design of the clutching device. Determining the state of the first clutching device 9 includes comparing the first hydraulic pressure signal 13 with the predetermined pressure values $p_1$, $p_2$ and $p_3$ and determining whether the first hydraulic pressure signal 13 is above or below at least one of the predetermined pressure values $p_1$, $p_2$ and $p_3$.

Since in FIG. 3 the first hydraulic pressure signal 13 is initially below the first predetermined pressure value $p_1$, the controller 8 determines that the first clutching device 9 is in a disengaged state 14. As the first clutching device 9 is in the disengaged state 14, the value of the pressure signal 13 exceeds the second predetermined pressure value $p_2$ at a point in time $t_0$. Accordingly, the controller 8 determines that, starting at $t_0$, the first clutching device 9 enters a filling state 15 for as long as the pressure signal 13 exceeds $p_2$. At a point in time $t_1$ ($t_1 > t_0$) the pressure signal 13 falls again below $p_2$, thereby ending the filling state 15. As the pressure signal 13 remains above $p_1$ for $t > t_1$, the first clutching device 9 does not again enter the disengaged state 14 in FIG. 3. The hydraulic pressure signal 13 then increases again, its value exceeding $p_2$. Since the pressure signal 13 is not in the disengaged state 14 as it exceeds $p_2$, the first clutching device 9 does not again enter the filling state 15 as the pressure signal 13 exceeds $p_2$. However, as the pressure signal 13 exceeds p3 at a point in time $t_2$ ($t_2 > t_1$), the controller 8 determines that, starting at $t_2$, the first clutching device 9 enters an engaged state 16.

The controller 8 comprises a timer (not shown). Each time the first hydraulic pressure signal 13 exceeds the second predetermined pressure value $p_2$ and the first clutching device 9 enters the filling state 15 from the disengaged state 14, the timer is started. The timer determines the duration of a filling time period during which the first clutching device 9 remains in the filling state 15. If the first hydraulic pressure signal 13 has not exceeded the third pressure value $p_3$ a predetermined time period $\Delta t_{fill,max}$ after entering the filling state 15, the controller 8 sets the state of the first clutching device 9 back to the disengaged state 14. In this manner, random pressure peaks or aborted shifts are less likely to entail errors in the clutch state determination process.

In FIG. 4 the first hydraulic pressure signal 13 in the first clutch chamber of the first clutching device 9 is initially above $p_3$. Therefore, the controller 8 determines that the first clutching device 9 is initially in the engaged state 16. As the first hydraulic pressure signal 13 decreases, its value falls below the third predetermined pressure value $p_3$ at a point in time $t_3$ and, subsequently, falls below $p_1$ at a point in time $t_4$ ($t_4 > t_3$). Only when the first hydraulic pressure signal 13 falls below $p_1$ at the point in time $t_4$ the controller 8 determines that, starting at $t_4$, the first clutching device 9 enters the disengaged state 14.

Figure 5:
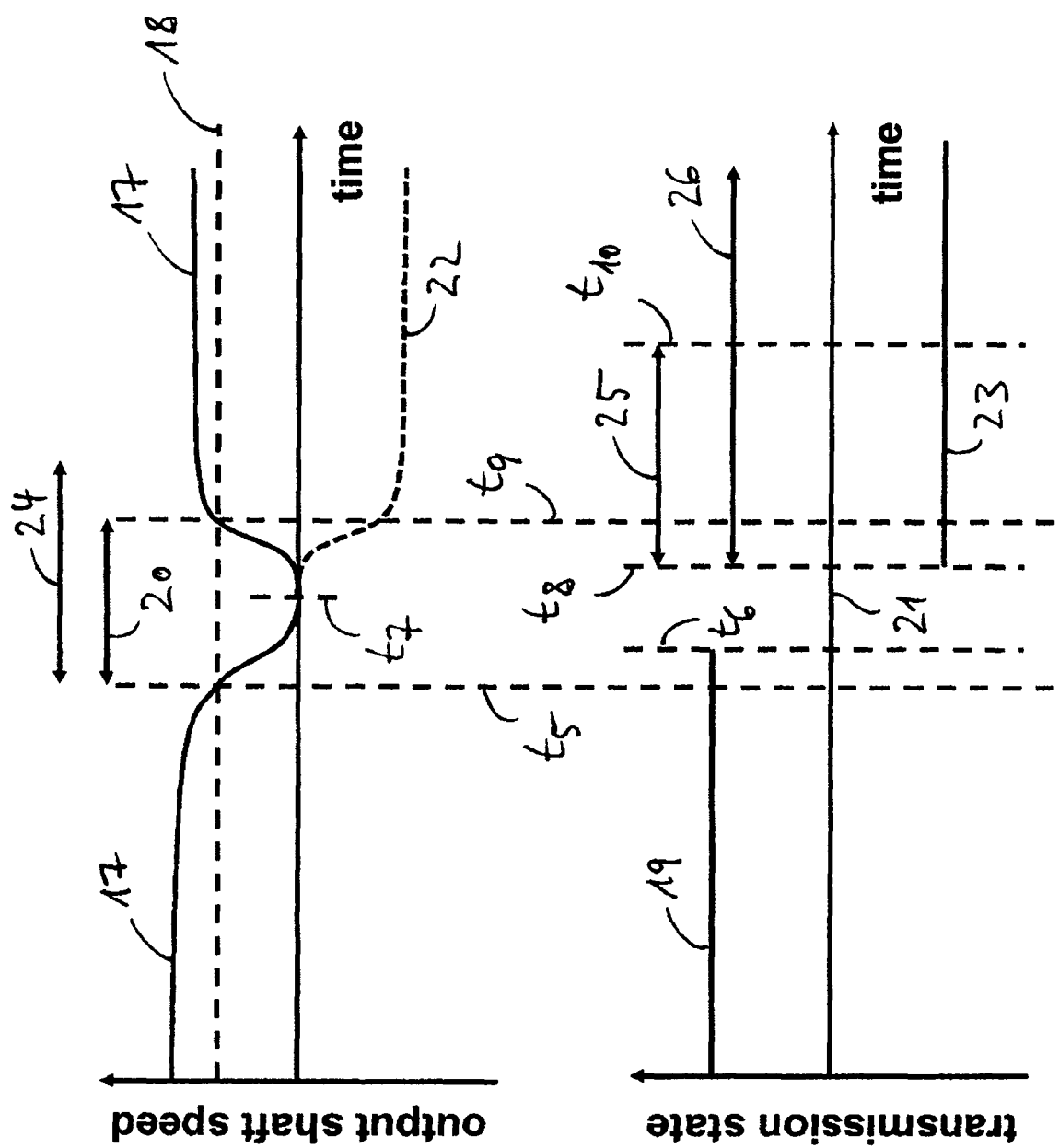
FIG. 5 shows a first situation in which the controller of FIG. 1 detects a reversal in the direction of rotation of the output shaft.
Figure 6:
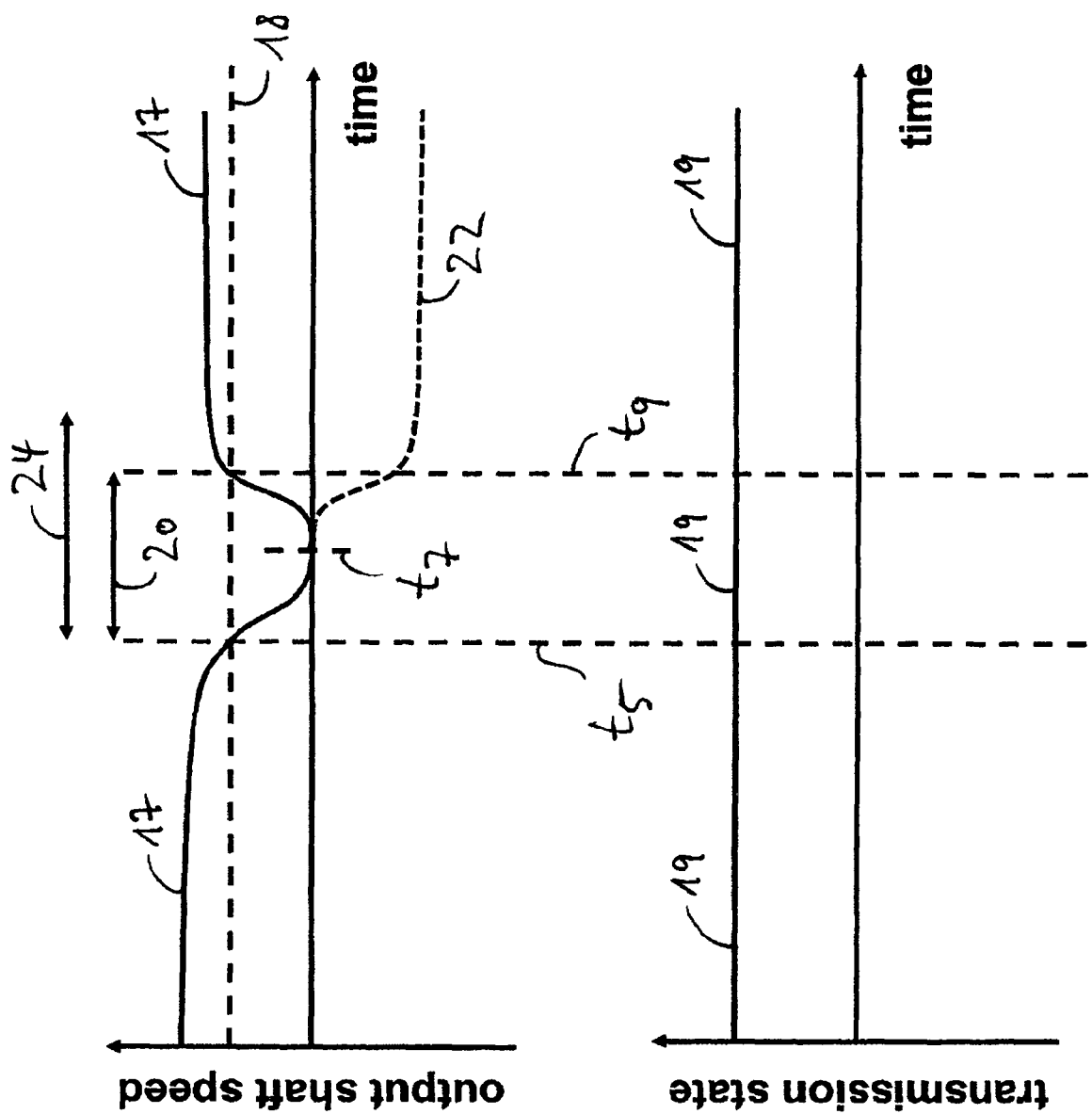
FIG. 6 shows a second situation in which the controller of FIG. 1 detects a reversal in the direction of rotation of the output shaft.

FIGS. 5 and 6 each depict a situation in which the controller 8 detects a change in the absolute direction of rotation of the output shaft 5 of the transmission 3 of the driveline 100 of FIG. 1 or of the driveline 200 of FIG. 2 based on non-direction sensitive speed data received from the speed sensor 7 and based on the duration of a first continuous time interval 20 during which a speed 17 of the output shaft 5 is continually below a first predetermined speed value 18.

The upper graphs in FIGS. 5 and 6 show a time trace of the speed 17 of the output shaft 5. The controller 8 determines the speed 17 based on non-direction sensitive speed data received from the speed sensor 7. The speed 17 of the output shaft 5 is the absolute value of the rotational speed of the output shaft 5. As the output shaft 5 is in driving engagement with the vehicle output 6, the speed 17 is linked to the speed at which the vehicle is traveling. The lower graphs in FIGS. 5 and 6 show a time trace of the state of the transmission 3, wherein the controller 8 determines the state of the transmission 3 by determining the state of the clutching devices 9, 11 of the transmission 3, as previously described with reference to FIGS. 3 and 4.

In FIG. 5 the speed 17 of the output shaft 5 is initially above the first predetermined speed value 18, indicated by a dashed horizontal line in the upper graph of FIG. 5. In FIG. 5, the vehicle initially moves in the forward direction. In FIGS. 5 and 6 the power source 1 turns in the same direction throughout, for example in the clockwise direction. In the situation depicted in FIG. 5 the coupling device 2 causes the input shaft 4 to turn in the same direction as the power source 1 (see FIGS. 1 and 2). Typically, the first predetermined speed value 18 has a value of several revolutions per second, for example at most $1\ s^{-1}$, at most $2\ s^{-1}$ or at most $3\ s^{-1}$. Based on the transmission signal received from the transmission 3, the controller 8 determines that for $t<t_5$ in FIG. 5 the transmission 3 is in the first transmission state 19, that is the output shaft 5 is drivingly engaged with the input shaft 4, the first clutching device 9 is engaged and the second clutching device 11 is disengaged. Based on information stored in the memory of the controller 8 the controller 8 determines that in the first transmission state 19 both the input shaft 4 and the output shaft 5 turn in the same direction.

As the vehicle decelerates, the controller 8 determines that the speed 17 of the output shaft 5 drops below the first predetermined speed value 18 at the point in time $t_5$. The point in time $t_5$ marks the beginning of the first continuous time interval 20 during which the speed 17 is continually below the first predetermined speed value 18. At a subsequent point in time $t_6$ ($t_6>t_5$) the controller 8 determines that the first clutching device 9 is disengaged and the transmission 3 is shifted from the first transmission state 19 to a neutral transmission state 21. In the neutral transmission state 21 both clutching devices 9, 11 are disengaged so that the output shaft 5 is disengaged from the input shaft 4 and no torque is transferred from the power source 1 to the output shaft 5.

At a subsequent point in time $t_7$ ($t_7>t_6$) the vehicle comes to a halt. At $t_7$ the vehicle reverses its direction of motion and the output shaft 5 reverses its absolute direction of rotation. Starting at $t_7$, the vehicle accelerates in the reverse direction, indicated by the increasing negative rotational speed 22, depicted as a dashed line in the upper graph of FIG. 5. For $t>t_7$ the corresponding increasing speed 17 measured by the non-direction sensitive speed sensor 7 is the absolute value of the negative rotational speed 22.

At a subsequent point in time $t_8$ ($t_8>t_7$) the controller 8 determines that the second clutching device 11 is engaged while the first clutching device 9 remains disengaged. That is, at $t_8$ the controller 8 detects or determines that the transmission 3 is shifted from the neutral transmission state 21 to the second transmission state 23. Based on information stored in the memory of the controller 8 the controller 8 further determines that in the second transmission state 23 both the input shaft 4 and the output shaft 5 turn in opposite directions.

As the transmission 3 is shifted to the second transmission state at $t_8$, the vehicle accelerates in the reverse direction and the speed 17 measured by the speed sensor 7 increases. At a subsequent point in time $t_9$ ($t_9>t_8$) the controller 8 determines that the speed 17 again exceeds the first predetermined speed value 18. Thus, the point in time $t_9$ marks the end of the first continuous time interval 20 during which the speed 17 is continually below the first predetermined speed value 18. As the controller 8 detects the end of the first continuous time interval 20 at the point in time $t_9$, the controller 8 compares the duration of the first continuous time interval 20 to a predetermined duration 24. The predetermined duration 24 may have a duration of at most 1 s or of at most 0.5 s, for example. In FIG. 5, the controller 8 determines that the duration of the first continuous time interval 20 is shorter than the predetermined duration 24. Therefore, the controller 8 detects or determines that a reversal in the direction of rotation of the output shaft 5 has occurred during the first continuous time interval 20.

FIG. 6 differs from FIG. 5 in that the transmission 3 remains in the same first state 19 before, during and after the first continuous time interval 20, as indicated in the lower graph of FIG. 6. As in FIG. 5, in FIG. 6 the duration of the first continuous time interval 20 is shorter than the predetermined duration 24. Therefore, in the situation depicted in FIG. 6 the controller 8 again detects or determines that a reversal in the absolute direction of rotation of the output shaft 5 has occurred during the first continuous time interval 20. For example, FIG. 6 may correspond with a situation where the vehicle rolls upward on a slope, is decelerated and then pulled back down the slope due to the gravitational force acting on the vehicle.

To a person of ordinary skill in the art of automotive transmissions it is evident that the above-described process of determining a change in the direction of rotation of the output shaft 5 may easily be applied to a process of determining a change in the direction of rotation of the drum shaft 24, of the input shaft 4 or of any other shaft of the transmission 3.

The controller 8 of the drivelines 100 and 200 is further configured to carry out an initialization procedure for determining the absolute direction of rotation of the output shaft 5. An example of a possible implementation of the initialization procedure is depicted in FIG. 5. The initialization procedure includes the steps of determining the direction of rotation of the power source 1 based on the above-mentioned rotational direction data which is indicative of the direction of rotation of the power source 1, and determining the absolute direction of rotation of the output shaft 5 based on the direction of rotation of the power source 1 and based on the state of the transmission 3.

In the drivelines 100 of FIG. 1 and 200 of FIG. 2 where the input shaft 4 is coupled to the power source 1 through the fluid coupling device 2, the controller 8 may determine the absolute direction of rotation of the output shaft 5 based on the direction of rotation of the power source 1 and on the state of the transmission 3 with a high degree of certainty only after the end of the previously mentioned stabilization phase, because only after the end of the stabilization phase the turbine portion 2b of the fluid coupling device 2 has a defined direction of rotation relative to the direction of rotation of the impeller portion 2a of the fluid coupling device 2. The duration 25 of the stabilization phase (see FIG. 5) may be stored in the memory of the controller 8. For example, the duration 25 of the stabilization phase may be at least 100 ms, at least 200 ms, or at least 300 ms.

The controller 8 is configured to initiate the stabilization phase based on the transmission data received from the transmission 3. For example, the controller 8 may initiate the stabilization phase each time the transmission has completed a shift to a transmission state in which the output shaft 5 is drivingly engaged with the input shaft 4. The time period during which the transmission 3 is continually in the same engaged transmission state defines a second continuous time interval 26 (see FIG. 5). Thus, the controller 8 is configured to detect that the stabilization phase has ended once the duration of the second continuous time interval 26 exceeds the duration 25 of the stabilization phase.

In other words, the initialization procedure carried out by the controller 8 may further include the steps of determining the duration of the second continuous time interval 26, comparing the duration of the second continuous time interval 26 with the duration 25 of the stabilization phase; and, if the duration of the second continuous time interval 26 exceeds the second predetermined duration 25 of the stabilization phase, determining the absolute direction of rotation of the output shaft 5 based on the known direction of rotation of the power source 1, based on the state of the transmission 3 which defines the direction of rotation of the output shaft 5 relative to the direction of rotation of the input shaft 4, and based on the known direction of rotation of the turbine portion 2b of the fluid coupling device 2 relative to the direction of rotation of the impeller portion 2a of the fluid coupling device 2.

In some cases, in particular when the input shaft 4 of the transmission 3 and the power source 1 are coupled through a fluid coupling device such as the fluid coupling device 2 of the drivelines 100, 200, the relationship between the direction of rotation of the output shaft 5 and the direction of rotation of the power source 1 may be determined with a high degree of certainty only when the speed of the input shaft 4, the speed of the output shaft 5 or the speed of the vehicle the exceeds a second predetermined speed value. This may be due to the fact that speed sensors do not provide accurate speed data at low speeds. Also, this may be due to the fact that the turbine portion 2b of the fluid coupling device 2 does not have a defined direction of rotation relative to the direction of rotation of the impeller portion 2a of the fluid coupling device 2 at low speeds. Therefore, the controller 8 may further be configured to determine the absolute direction of rotation of the output shaft 5 based on the direction of rotation of the power source 1 and based on the state of the transmission 3 only once the speed of the input shaft 4, the speed of the output shaft 5 or the vehicle speed exceeds the second predetermined speed value.

The controller 8 may be configured to carry out the above-described initialization procedure for determining the absolute direction of rotation of the output shaft 5 each time the power source 1 is turned on after the power source has been switched off. Also, the controller 8 may be configured to carry out the initialization procedure each time the first continuous time interval 20 has ended and the controller determines that the duration of the first continuous time interval 20 is longer than the predetermined duration 24, i. e. each time the vehicle has been stationary or substantially stationary for a time period that exceeds the predetermined duration 24.

In the situation depicted in FIG. 5 the controller 8 initiates the stabilization phase at the point in time $t_8$, i. e. once the transmission 3 is shifted to the second transmission state 23 in which the output shaft 5 and the input shaft 4 are drivingly engaged. At a subsequent point in time $t_{10}$ ($t_{10}>t_9>t_8$) the duration of the second continuous time interval 26 during which the transmission 3 is continually in the same engaged transmission state 23 exceeds the duration 25 of the stabilization phase. Thus, at $t_{10}$ it can be assumed with a high degree of certainty that the turbine portion 2b of the coupling device 2 rotates in a known predetermined direction relative to the direction of rotation of the power source 1. Therefore, at $t_{10}$ the controller 8 may determine the absolute direction of rotation of the output shaft 5 based on the known direction of rotation of the power source 1, based on the known state of the transmission 3. In case of a fluid coupling between the transmission 3 and the power source 1 determining the absolute direction of rotation 5 of the output shaft 5 may further be based on the known direction of rotation of the turbine portion 2b of the fluid coupling device 2 relative to the direction of rotation of the impeller portion 2a of the fluid coupling device 2.

Figure 7:
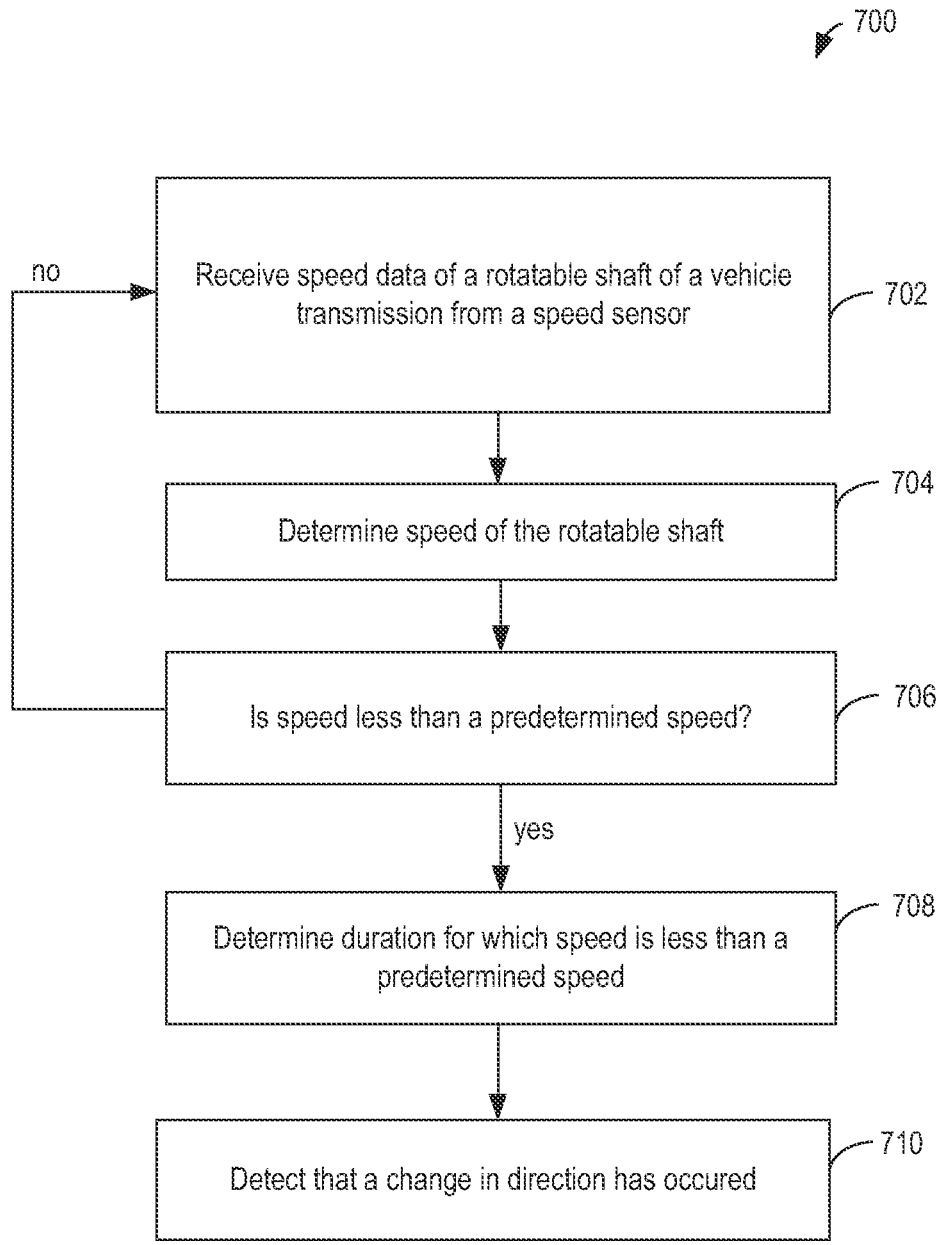
FIG. 7 is a flow chart of a method 700 of detecting a change in the direction of rotation of a rotatable shaft according to an embodiment.

The flowchart of the method 700 of FIG. 7 determines a speed of a rotatable shaft of a vehicle transmission based on non-direction sensitive speed data received from a non-direction sensitive rotational speed sensor at 702. The method 700 determines, based on the speed of the rotatable shaft as determined at 704, the duration 708 of a first continuous time interval during which the speed of the rotatable shaft is continually smaller than a first predetermined speed value as determined at 706; and detects at 710 that a change in the direction of rotation of the rotatable shaft has occurred during the first continuous time interval if the duration of the first continuous time interval is shorter than the predetermined duration.

To a person of ordinary skill in the art of automotive transmissions it is evident that the above-described process of determining the absolute direction of rotation of the output shaft 5 may easily be applied to a process of determining the absolute direction of rotation of the drum shaft 24, of the input shaft 4 or of any other shaft of the transmission 3.

The invention claimed is:

1. A method of detecting a change in direction of rotation of a rotatable shaft based on non-direction sensitive rotational speed data, the method comprising the steps:
   determining a speed of a rotatable shaft of a vehicle transmission based on non-direction sensitive speed data received from a non-direction sensitive rotational speed sensor, wherein the speed of the rotatable shaft is the absolute value of the rotational speed of the rotatable shaft;
   determining, based on the speed of the rotatable shaft, if a duration of a first continuous time interval during which the speed of the rotatable shaft is continually smaller than a first predetermined speed value is shorter than a predetermined duration; and
   detecting that the change in the direction of rotation of the rotatable shaft has occurred during the first continuous time interval if the duration of the first continuous time interval is shorter than the predetermined duration.

2. The method according to claim 1, wherein the rotatable shaft is drivingly engaged with or selectively drivingly engaged with a ground engaging structure of a vehicle.

3. The method according to claim 2, wherein the first predetermined speed value is set based on at least one transmission signal received from the vehicle transmission, wherein the at least one transmission signal is indicative of a speed ratio between the rotatable shaft and the ground engaging structure.

4. The method according to claim 3, wherein the first predetermined speed value is set such that it corresponds with a predetermined vehicle speed, wherein the predetermined vehicle speed is at most 5 km/h.

5. The method according to claim 1, wherein the predetermined duration is at most 2 s.

6. The method according to claim 1, further comprising the step of determining the direction of rotation of the rotatable shaft based on power source data indicative of a direction of rotation of a power source drivingly engaged with or coupled to the rotatable shaft, including through a fluid coupling device, and based on at least one transmission signal received from the vehicle transmission, wherein the at least one transmission signal is indicative of the direction of rotation of the rotatable shaft relative to the direction of rotation of the power source.

7. The method according to claim 6, wherein the at least one transmission signal comprises at least one clutch signal indicative of a state of at least one clutching device of the vehicle transmission.

8. The method according to claim 7, wherein the at least one clutch signal comprises at least one of:
- at least one hydraulic pressure signal indicative of a hydraulic pressure in at least one clutch chamber of at least one hydraulic clutching device of the vehicle transmission; and
- at least one electric signal for controlling the at least one clutching device of the vehicle transmission, including for controlling at least one hydraulic valve of the at least one hydraulic clutching device.

9. The method according to claim 8, comprising the step of determining the state of the at least one clutching device based on whether the hydraulic pressure is above or below at least one predetermined pressure value.

10. The method according to claim 9, wherein the vehicle transmission is coupled to the power source through a fluid coupling device, and wherein the step of determining the direction of rotation of the rotatable shaft is carried out if or once a duration of a second continuous time interval during which the vehicle transmission is continually in a same transmission state exceeds a duration of a stabilization phase, wherein the duration of the stabilization phase is a time period which is needed for a turbine portion of the fluid coupling device to turn in a predetermined direction relative to an impeller portion of the fluid coupling device.

11. The method according to claim 10, wherein the step of determining the direction of rotation of the rotatable shaft is carried out if or once the speed of the rotatable shaft, a speed of a vehicle, or a speed of an input shaft of the vehicle transmission exceeds a second predetermined speed value.

12. The method according to claim 11, wherein the step of determining the direction of rotation of the rotatable shaft is carried out each time the first continuous time interval has ended and the duration of the first continuous time interval exceeds the predetermined duration.

13. The method according to claim 1, further including the step of controlling a shift of the vehicle transmission based on the direction of rotation of the rotatable shaft.

* * * * *